Sept. 13, 1960 H. R. CALER ET AL 2,952,768
AUTOMATIC PEAK LEVEL INDICATOR SYSTEM
Filed Aug. 26, 1957 4 Sheets-Sheet 2

INVENTORS
HERSCHEL R. CALER
MATTHEW RUSSO
BY EDWARD N. SINGER
ATTORNEYS

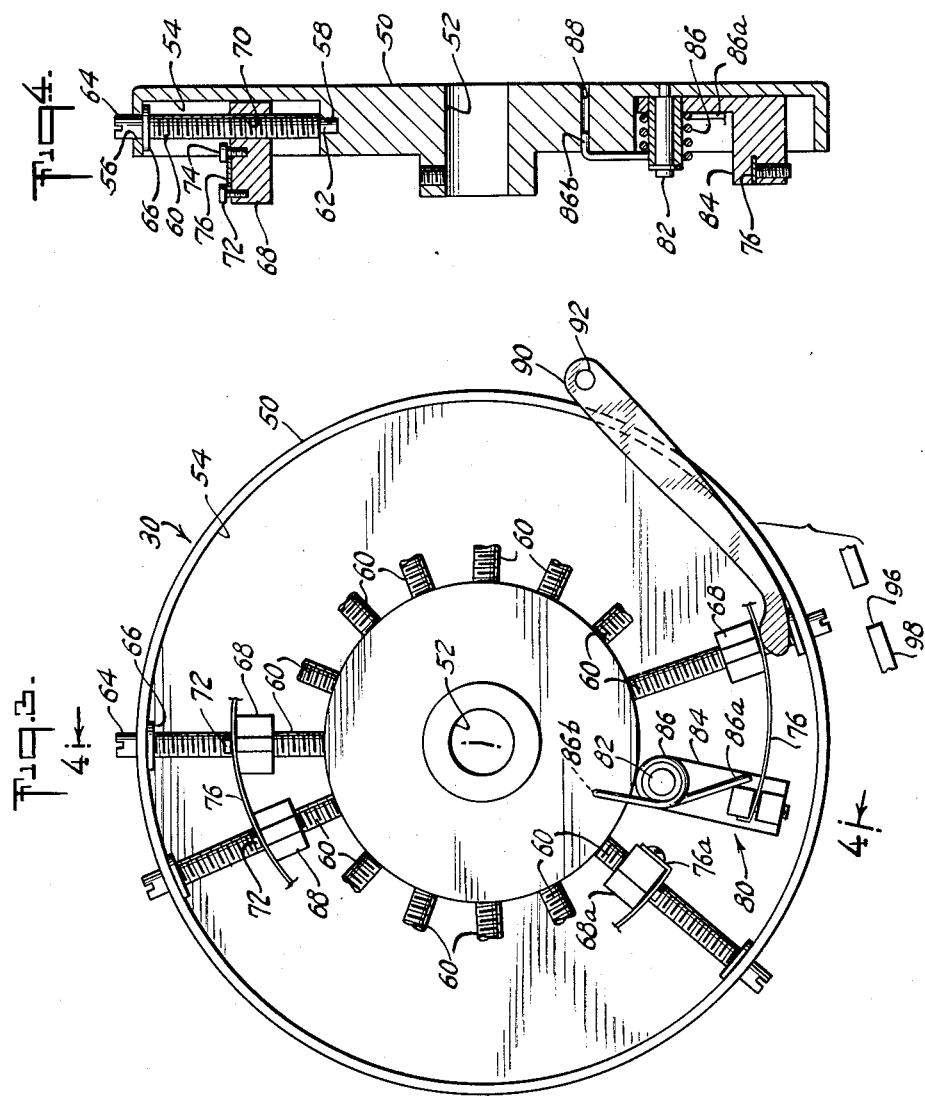

Sept. 13, 1960     H. R. CALER ET AL     2,952,768
AUTOMATIC PEAK LEVEL INDICATOR SYSTEM
Filed Aug. 26, 1957     4 Sheets-Sheet 4
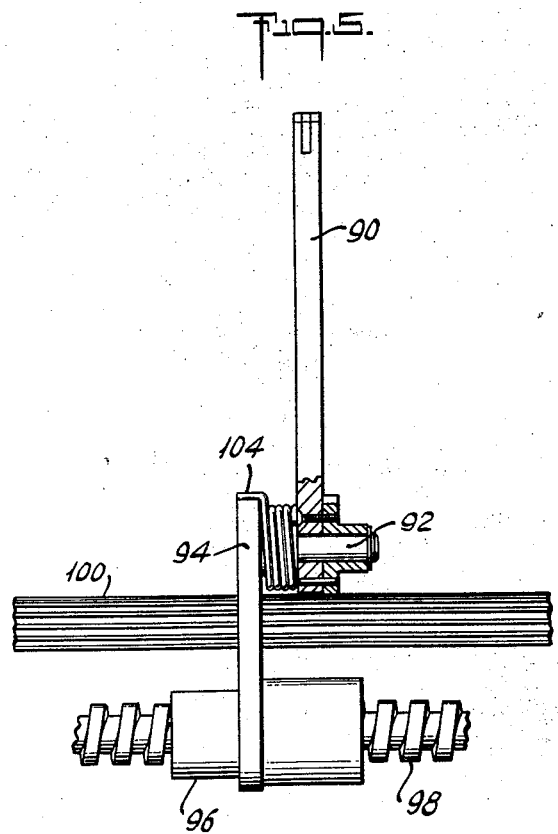
INVENTORS
HERSCHEL R. CALER
MATTHEW RUSSO
BY EDWARD N. SINGER
ATTORNEYS United States Patent Office 2,952,768
Patented Sept. 13, 1960

2,952,768
AUTOMATIC PEAK LEVEL INDICATOR SYSTEM

Herschel R. Caler, Baltimore, Md., and Matthew Russo, Brooklyn, and Edward N. Singer, Queens Village, N.Y., assignors to the United States of America as represented by the Secretary of the Navy Filed Aug. 26, 1957, Ser. No. 680,368

8 Claims. (Cl. 250—1)

(Granted under Title 35, U.S. Code (1952), sec. 266)

The invention described herein may be manufactured and used by or for the Government of the United States of America for governmental purposes without the payment of any royalties thereon or therefor.

This invention concerns radio frequency measurements and more particularly to improvements in methods and means for scanning a particular radio frequency range for excessive radio interference.

Radio interference is defined as any electrical disturbance which causes an indesirable response or malfunctioning in any electronic equipment. The interference energy may be either radiated or conducted. Radio interference is a major problem today in the electronics field. The complexity of the problem of radio interference has increased tremendously in recent years, owing to the large increase in the number and kinds of electrical electronic and electromagnetic equipments and also owing to the number of such equipments that must often be grouped together in a small area such as on a ship, plane, a communication center, a control center and the like. Any electrical, electronic, or electromagnetic equipment may generate radio interference energy. The radio interference energy generated by an equipment decreases the reliability, efficiency and accuracy of other operating equipments that intercept the radio interference energy. Information in process by the other equipments can be distorted or modified by radio interference energy.

In order to design equipment that is not a source of and/or is not susceptible to radio interference, there must be made available adequate means for measuring radio interference and susceptibility. The type of radio interference meters that have been in use until now have not been satisfactory. Measurements made with them involve a complicated and laborious time consuming point-by-point procedure which is inherently inaccurate. Many adjustments need to be made for each measurement. The adjustments that are necessary before a single measurement at a particular frequency is completed take about ten minutes. Measurements may be made at equally spaced frequencies but the acceptable practice is three spaced frequencies per octave. Measurements at only three spaced frequencies per octave over the band of interest involves two, three and even four score measurements. At a round figure of ten minutes per measurements, the time involved is excessive.

Radio interference meters of the type in current use generally include a superheterodyne circuit, hereinafter referred to as a superhet circuit, having a band switch and a tuning dial whereby it is tunable over a wide range of frequency. One of the IF stages of the superhet circuit includes a gain control. An R.M.S. voltmeter is connected to the detector output. At each frequency that radio interference is measured, the radio interference meter needs to be carefully adjusted. Assuming radio interference at one megacycle is to be measured. The frequency tuning dial of the superhet circuit is adjusted for one megacycle. A calibrated signal generator is connected to the input of the superhet circuit. The signal generator is turned on and set to one megacycle. The gain of the signal generator is adjusted until its output is at a predetermined level, say 100 microvolts R.M.S. The R.M.S. voltmeter connected to the detector output of the superhet circuit is observed and if it indicates a voltage different from 100 microvolts, the gain control in the IF stage of the superhet is adjusted until 100 microvolts is indicated on the output voltmeter. Then the signal generator is disconnected from the input. An antenna is connected to the input if radiated radio interference is to be measured; if conducted radio interference is to be measured, the input of the circuit is connected directly to the source of conducted radio interference. The R.M.S. voltmeter at the output of the superhet circuit indicates the radio interference voltage at one megacycle. These steps are repeated for each frequency of interest. However, in radio interference measurements peak voltage readings usually are more significant than R.M.S. readings. To obtain peak voltage readings, there are additional steps to each measurement. For peak measurements, the radio interference meter includes a variable bias source connected to the output detector and a direct current voltmeter connected to the variable bias source. An amplifier is connected to the output detector, and either earphones or a suitable lamp is connected to the amplifier. The variable bias source is set initially so that there is an output from the detector which output is either heard in the headset or seen on the lamp. The bias then is slowly increased, progressively reducing the output from the detector until a threshold is reached where the highest amplitude random peak does not get through and there is no more output from the detector. This adjustment is tricky since the peaks are randomly distributed and vary greatly in amplitude. When the bias is just enough to block the output from the detector, the radio interference peak voltage at that frequency is read on the direct current voltmeter; the bias voltage that was necessary to cut off the detector is equal to the peak voltage. Where the absolute peak is not as important the peaks averaged over a predetermined interval, the second detector feeds into an RC circuit of a predetermined time constant. In that case the variable bias circuit is arranged to balance the averaged peak or quasi peak rather than the absolute peak.

As mentioned previously, these measurements are time consuming, complicated, laborious and inherently inaccurate. Furthermore, the measurements are not repeatable when obtained this way. In measuring peak voltage, the bias must be increased very very gradually to the cutoff threshold. The rate of change of bias determines to some extent the result obtained. One measurement made twice by one man or by two men working separately rarely produce the same results.

There is another factor that complicates radio frequency measurements. The maximum tolerable level or specification limit of radio interference is not a constant for all frequencies. The tolerable level of radio interference varies with frequency. When the measurements described above are completed it is necessary to check the measurements one-by-one against a specification graph or chart indicating the maximum tolerable level or radio interference.

An object of this invention is to provide an improved method and means of checking for and ascertaining the presence of excessive radio interference which is not as complicated, laborious, and time consuming, is more accurate, and yields repeatable results.

A further object is to provide an improved method and means of checking for and ascertaining the presence of excessive radio interference by scanning a frequency band.

Other objects and many of the attendant advantages of this invention will be readily appreciated as the same becomes better understood by reference to the following detailed description when considered in connection with the accompanying drawings wherein:

Figs. 3 and 4 are plan and sectional views respectively of an adjustable cam for the equipment of Fig. 1; and Fig. 5 is a plan view partly in section of a cam follower arrangement for use with several cams on a common shaft.

Figure 1:
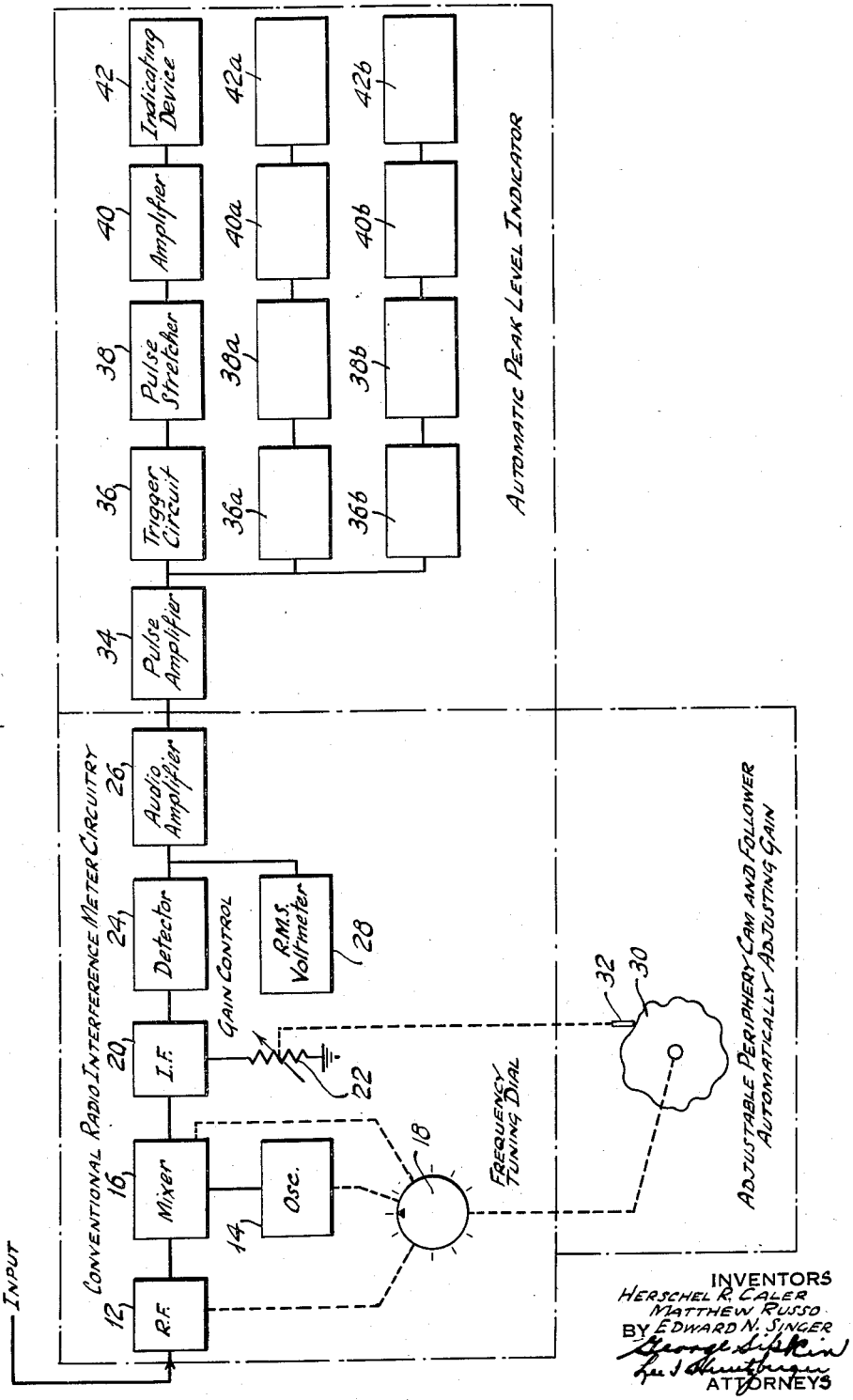
Fig. 1 is a block diagram of the invention.

In Fig. 1 there is shown a superhet circuit having a radio frequency input stage 12 and a local oscillator 14 connected to a mixer 16; a frequency dial is connected to tune the stages 12, 14, and 16 together. The circuit may also include a conventional band switching arrangement not shown on the drawing. One or more intermediate frequency stages 20 is connected to the mixer. A gain control 22 is connected in the intermediate frequency stage 20. A detector 24 is connected to the intermediate frequency stage 20. An audio amplifier 26 and an R.M.S. voltmeter 28 are connected to the output of detector 24. The combination thus far described is conventional in the radio frequency meter art.

A novel feature of this invention is an adjustable periphery cam 30 mechanically coupled to frequency tuning dial 18 and rotatable therewith. This cam is described in detail hereinafter. A cam followed 32 sides on the periphery of the cam. The cam follower is mechanically coupled to the gain control 22 in intermediate frequency stage 20. As the frequency tuning dial is turned, the cam automatically corrects the gain of the superhet circuit. If the superhet circuit includes a band switch for switching among several frequency bands, one cam 30 is provided for use in each of the several bands; the several cams are mounted side-by-side on a common shaft and the cam follower is selectively engageable with the one of the several cams corresponding to the band selected by the band selector switch.

Figure 2:
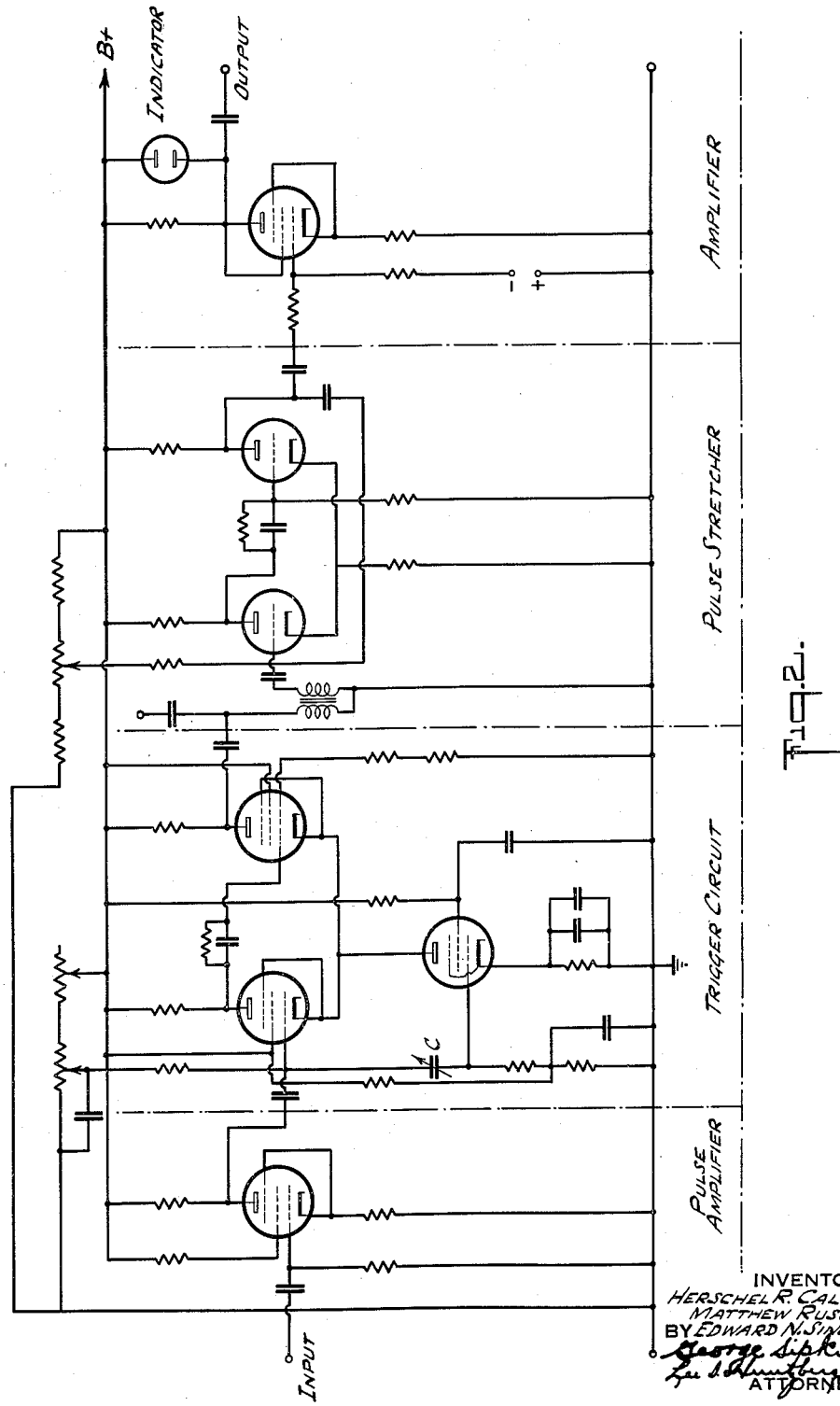
Fig. 2 is a circuit diagram of the automatic peak level indicator of Fig. 1.

Another novel feature introduced by this invention is an automatic peak level indicator. It includes a pulse amplifier 34 connected to a trigger circuit 36, in turn connected to a pulse stretcher 38, in turn connected to an amplifier 40, in turn connected with an indicating device 42. Pulse amplifier 34 is conventional. The trigger circuit 36 is preferably a Schmitt trigger circuit. A description of a Schmitt trigger circuit is located in "Electronics," by Elmore and Sands, which is part of the National Nuclear Energy Series, published by McGraw-Hill, 1949, beginning on page 246. A Schmitt trigger circuit is stable, is a substantially constant current source when triggered, can receive high amplitude input pulses without drawing grid current, and is readily adjustable to respond to trigger pulses of a predetermined level. The pulse stretcher 38 may be a one-shot multivibrator which is triggered by an output from the trigger circuit 36 and which produces a pulse whose duration is longer than the pulse from the trigger circuit 36. A pulse from pulse stretcher 38 is fed into amplifier 40. The amplifier 40 is biased beyond cutoff. When a pulse from pulse stretcher 38 arrives at the grid of this amplifier, it overrides the bias causing the amplifier to conduct. The output of the amplifier activates the indicating device 42. An embodiment of the automatic peak level indicator is shown in detail in Fig. 2. No detailed description of the components or their specific functions is included herein since the separate stages function in the conventional manner known in the art.

In Fig. 1 several parallel channels are shown in the automatic peak level indicator. The several channels are identical except that each is adjusted to respond at a different level. If indicating device 42 is energized, the voltage level of radio interference at that frequency is known to be between certain limits; if indicating devices 42 and 42a are both energized the voltage level of radio interference at that frequency are known to be between certain higher limits; if indicating devices 42, 42a, and 42b are energized, the voltage level of radio interference at that frequency is known to be higher than the previous limits. During calibration, trigger threshold for each channel is set in accordance with the limits desired.

The cam 30 shown in Figs. 3 and 4 includes a main body member 50. The main body member 50 is formed with a central bore 52 and a circular channel 54. Radially aligned holes 56 and 58 are formed in the body member 50 at angularly spaced intervals. The body member 50 is so fabricated that the spacing corresponds to selected frequency test points on the frequency tuning dial. A screw member 60 is rotatably supported in each pair of holes 56 and 58. The intermediate portion of each screw member is threaded. One end of the screw member 60 is formed as a short reduced diameter section 62 for a sliding fit in the hole 58. The other end of the screw member 60 is formed as a slotted circular head 64 for a sliding fit in the hole 56. Just beneath the head, the screw member 60 is formed with a circular groove, not shown, for receiving a retaining ring 66. The screw member 60 is accurately machined so that its length between the reduced portion 62 and head 64 is equal to the width of channel 54. There is substantially no play between the screw member 60 and the main body member 50. A traversing block 68 threadedly engages each of the screw members 60, respectively. The radial dimension of the traversing blocks 68 is a fraction of the radial dimension of the circular channel 54; their length exceeds the depth of channel 54 so that when bearing against the bottom of channel 54, the block projects to a substantial extent beyond the main body member 50. The width dimension of the traversing block is stepped so that it is wider at its inner end portion within the channel than at its portion protruding beyond the channel. The width of each traversing block 68 is such that two adjacent blocks will not interfere with one another when moved to their innermost limit of travel. The distance between the axis of the threaded hole 70 and one end of each traversing block 68 is substantially equal to the distance between the axis of aligned holes 56 and 58 and the bottom of the channel 54 so that when the traversing blocks 68 are assembled on the screw members 60 they abut the bottom of the channel 54 so that they cannot wiggle about their respective screw members 60. A pair of accurately spaced apart screws 72 and 74 are threaded into the outer side of each traverse block 68. The screws 72 and 74 are formed with a step under the head so that the heads do not seat against the surface of the traverse block 68. An elongated flat ribbon spring 76 of the type used as a mainspring in a clock slidably engages the reduced width portion of each traverse block 68 and the stepped portions of screws 72 and 74.

One end 76a of the flat ribbon spring is secured to one of the traverse blocks 68a. The other end of the flat ribbon spring 76 is secured to a tension device 80. The tension device 80 includes a pivot post 82 secured to the bottom of channel 54 and a pivot arm 84 assembled on the pivot post 82. The portion of the pivot arm 84 engaging the post is cylindrical. A coiled torsion spring 86 is assembled over the cylindrical portion of the pivot arm 84. One end 86a of the torsion spring 86 abuts the pivot arm 84 and the other end 86b seats in a hole in the main body member 50. The other end 76b of the flat ribbon spring 76 is secured to the pivot arm 84 by any convenient means. When a traverse block is moved to a position closer to the axis of the main body member 50, the pivot arm 84 moves clockwise to take up the slack in the flat ribbon spring; when a traverse block is moved to a position further from the axis of the main body portion, the pivot arm is moved counterclockwise against the bias of the spring 86. If it is expected that the arm 84 could not yield or take to the extent necessary, a drum-like member can be substituted for the arm 84.

The cam follower 90 is pivotally mounted on a pin 92. The pin 92 is secured to an arm 94 (Fig. 5) which in turn is secured to traverse nut 96. The nut engages an elongated traverse screw 98 that is manually rotatable. The elongated screw 98 is parallel to the shaft supporting the cams 30 and is located alongside the cams. An elongated rotatably supported pinion 100 is located alongside the screw 98. The pinion is mechanically coupled to gain control 22. A gear 102 pivotally mounted on pivot pin 92 is secured to cam follower 90 and is oscillatable therewith. A torsion spring 104 continuously biases the cam follower arm against the flat ribbon spring of the cam. The cam follower arm is manually movable out of engagement with a cam 30 so the traverse screw 98 may be rotated to move the cam follower to another cam.

The cam follower 90 engages the flat ribbon spring 76 of one of the cams 30. The cam follower arm is sufficiently long so that whether the traverse block is at the innermost limit of its travel, the outermost limit of its travel, or anywhere between, the follower engages the flat ribbon spring substantially along a radial line from the axis of cam 30. The screw member 60a, which is the screw member positioned adjacent the end of the arm 90, is engageable by a screw driver extended through an excess opening 96 in the housing 98 of the equipment. The span of flat ribbon spring 76 between each pair of adjacent traverse blocks 68 presents a smoothly curved surface.

When the equipment described is assembled the cams are adjusted before being mounted on their shaft. The traverse blocks 68 are located in the most logical positions initially. For example if the specified maximum limit of interference voltage increases only with increasing frequency or decreases only with increasing frequency, the traverse blocks all are initially positioned closer to one end of their travel; however, if the specified maximum limit of interference voltage varies first up and then down and then up again etc., with increasing frequency, the traverse blocks all are initially positioned near the center of their travel. Then the cams are each arcuately positioned on their shaft so that the screw members 60 are aligned with the hole 96 in housing 98 when the frequency tuning dial 18 is set at the frequency test points. The cams are secured on their shafts, and are separately adjusted for proper gain calibration. The band switch, not shown, is set for the lowest band. The cam follower 90 is held free of the cams 30 while the traverse screw 98 is rotated to position the cam follower adjacent the cam 30 corresponding to that band. A calibrated signal generator is connected to the radio frequency stage 12. The frequency tuning dial 18 is adjusted to the lowest frequency test point; the corresponding screw member 60 of the cam is automatically positioned in line with the opening 96. The specified maximum limit of radio interference voltage at that frequency is ascertained from a specification. The signal generator gain is adjusted until its output voltage is equal to the specification limit for that frequency. Then a screw driver is inserted through the hole 96 of housing 93 to adjust screw member 60a until the energization threshold of indicating device 42 is reached. The settings of the potentiometers in the circuit of Fig. 2 determine the input voltage level to pulse amplifier 34 necessary for energizing the indicator 42. The screw device 60a is adjusted until that triggering voltage is fed into the peak level indicator circuit. If the number of turns necessary for adjustment of the first one of the screw devices 60a to be adjusted, is unreasonable, the potentiometer settings in the indicator circuit (Fig. 2) are changed. When these steps are completed, the channel including stages 36, 38, 40 is not adjusted any more. The two other channels including stages 36a, 38a, 40a, 42a, and 36b, 38b, 40b, 42b are then adjusted so that they are triggered at different multiples of the voltage needed to trigger the channel 36, 38, 40, 42. For example, the signal generator gain is adjusted for double the voltage output and the channel 36a, 38a, 40a, 42a is adjusted until it is just triggered at that double voltage. Then the signal generator gain may be adjusted for triple the original voltage and the channel 36b, 38b, 40b, 42b is adjusted until it is just triggered. During the adjustment of the second and third channels, the cam 30 is not touched. After the three channels are adjusted they are not touched again during the calibration. At each successive frequency test point, the signal generator gain is set for providing specified maximum radio interference voltage and the respective screw member is adjusted until indicating device 42 is just energized. After the calibration steps are completed, the adjustment means are not touched again for a period of two or three months at which time the calibration is rechecked. However, the equipment must be recalibrated if there is a change in specification limits.

When the equipment is completely calibrated, it is ready to be used as a scanner. An antenna is connected to the radio frequency stage 12. The antenna is located where radio interference is to be checked. The frequency dial is turned back and forth several times. If the indicator 42 is not energized, the specification limit it not exceeded in the band for which the equipment is set. If it is energized, the tuning dial is slowly moved to ascertain the frequency or frequencies at which the indicating device 42 is energized. If indicating devices 42 and 42a are energized, double the specification limit is exceeded. If indicating devices 42, 42a, and 42b are energized, triple the specification limit is exceeded. Each band is checked in turn; the band switch selects the band and the cam follower 32 is moved into engagement with the corresponding cam 30 by pulling back the cam follower and rotating the traverse screw 98. A very wide frequency range can be checked in a matter of minutes for radio interference in excess of specification limits.

If needed a voltmeter or an oscilloscope can be connected to the output of audio amplifier 26 in order to obtain quantitative measurements where needed.

Obviously many modifications and variations of the present invention are possible in the light of the above teachings. It is therefore to be understood that within the scope of the appended claims the invention may be practiced otherwise than as specifically described.

We claim:

1. An improved radio interference meter comprising a superheterodyne circuit having a gain control and a manually continuously adjustable frequency tuning control, a peak level indicator circuit connected to the output of said superheterodyne circuit, said indicator circuit including adjustable means for setting a triggering voltage threshold level for said indicator circuit whereby each input voltage pulse to said indicator circuit in excess of the threshold level will cause transitory energization of said indicator circuit, an adjustable cam mechanically coupled to said frequency tuning control, a cam follower engaging said cam and mechanically coupled to said gain control, said adjustable cam including cam surface means and a plurality of independently adjustable means engaging said cam surface means at spaced points for varying the contour of said cam surface means, and tensioning means engaging said cam surface means to force said cam surface means to assume a smooth contour of minimum curvature between each adjacent pair of independently adjustable means, each of said adjustable means being so spaced on said cam as to correspond to particular frequency settings of said frequency tuning control, said cam being adapted after adjustment to set the gain of said superheterodyne circuit substantially in accordance with specification limits of radio interference voltage at all frequencies over the tunable frequency range of said meter.

2. An improved radio interference meter as defined in claim 1 wherein said peak level indicator circuit includes several indicator channels, each channel including independently adjustable means, respectively, for setting its triggering voltage threshold level so that the order of amplitude of input noise voltage pulse in excess of specification limits may be ascertained.

3. An improved radio interference meter as defined in claim 2 wherein each of said channels includes a Schmitt trigger circuit which is characterized by stability and by the characteristic of not drawing any substantial amount of grid current when its input grid is driven positive by a signal pulse whereby said Schmitt trigger circuit can function satisfactorily in response to noise voltage pulses occurring over a wide range of amplitudes.

4. An improved radio interference meter as defined in claim 1 wherein said adjustable cam includes a cam body rotatable about an axis therethrough by said frequency tuning control mechanically coupled therewith, said plurality of independently adjustable means of said cam including screw members journalled in said cam body with their axes coplanar and radial of the cam body axis and spaced apart angularly about the cam body axis to correspond to particular frequencies on said frequency tuning control, a plurality of traverse blocks threadedly engaged with said screw members respectively and engaging said cam body to preclude rotation of said traverse blocks with their respective screw members, whereby said traverse blocks are movable only toward or away from the cam body axis upon rotation of their respective screw member, said cam surface means consisting of a flat ribbon spring surrounding said traverse blocks collectively and secured at one end thereof to one of said traverse blocks, said tensioning means mounted on said cam body adjacent to the last mentioned one of said traverse blocks and engaging the other end of said flat ribbon spring and continuously tensioning said flat ribbon spring so that said flat ribbon spring presents a smooth continuous surface between each pair of adjacent traverse blocks.

5. An interference detector for use in scanning a selected frequency range for interference signals whose peak amplitudes exceed a predetermined tolerable threshold where said tolerable threshold varies with frequency between the limits of said selected frequency range, comprising: signal receiving and amplifying means having an adjustable gain control and also having an adjustable frequency tuner operable for tuning said means selectively anywhere from one limit to the other limit of said frequency range and operable for rapidly scanning said frequency range; electrical means coupled to the output of said amplifying means and responsive to incoming voltage peaks exceeding a particular level and operable to provide indications of their occurrence; and means linking said frequency tuner and said gain control and operable when said frequency tuner is set for any frequency within said selected frequency range to concurrently set said gain control for a gain level whereby the voltage output of said amplifying means exceeds the input response level of said electrical means only when an incoming signal peak exceeds the tolerable threshold level for that frequency and said amplifying means is tuned to the same frequency as the signal peak at the time of occurrence, whereby when the tuned frequency of said detector is varied to scan said selected frequency range, said electrical means affords indications of signal peaks within said selected frequency band that exceed the tolerable threshold level therefor.

6. An interference detector as defined in claim 5 wherein said electrical means includes several distinct channels that are independently adjustable for setting the input response level thereof so that the order of amplitude of incoming interference signal peaks in excess of said tolerable threshold level may be ascertained.

7. An interference detector as defined in claim 5 wherein said mechanical means includes a cam secured to said mechanically manipulatable frequency tuner and movable therewith and a cam follower secured to said mechanically manipulatable gain control and in engagement with said cam.

8. An interference detector as defined in claim 5 wherein said electrical means is of the type wherein the indications provided thereby are substantially in coincidence with the voltage peaks responsible therefor and the indications are immediately evident to an operator of said detector whereby the operator may rapidly ascertain where in said selected frequency range there is interference exceeding said tolerable threshold level.

References Cited in the file of this patent

UNITED STATES PATENTS

| | | |
|---|---|---|
| 1,729,911 | Smith | Oct. 1, 1929 |
| 1,737,063 | Smith | Nov. 26, 1929 |
| 1,854,239 | Weiland | Apr. 19, 1932 |
| 1,903,156 | Asbury | Mar. 28, 1933 |
| 2,099,971 | Dailey | Nov. 23, 1937 |
| 2,197,312 | Nelson | Apr. 16, 1940 |
| 2,399,702 | White | May 7, 1946 |
| 2,528,344 | Davis | Oct. 31, 1950 |
| 2,536,329 | Tyzzer | Jan. 2, 1951 |
| 2,538,781 | Herson | Jan. 23, 1951 |
| 2,594,911 | Goff | Apr. 29, 1952 |
| 2,779,869 | Gerks | Jan. 29, 1957 |
| 2,805,331 | Wolford | Sept. 3, 1957 |
| 2,824,466 | Skwarek | Feb. 25, 1958 |